United States Patent Office

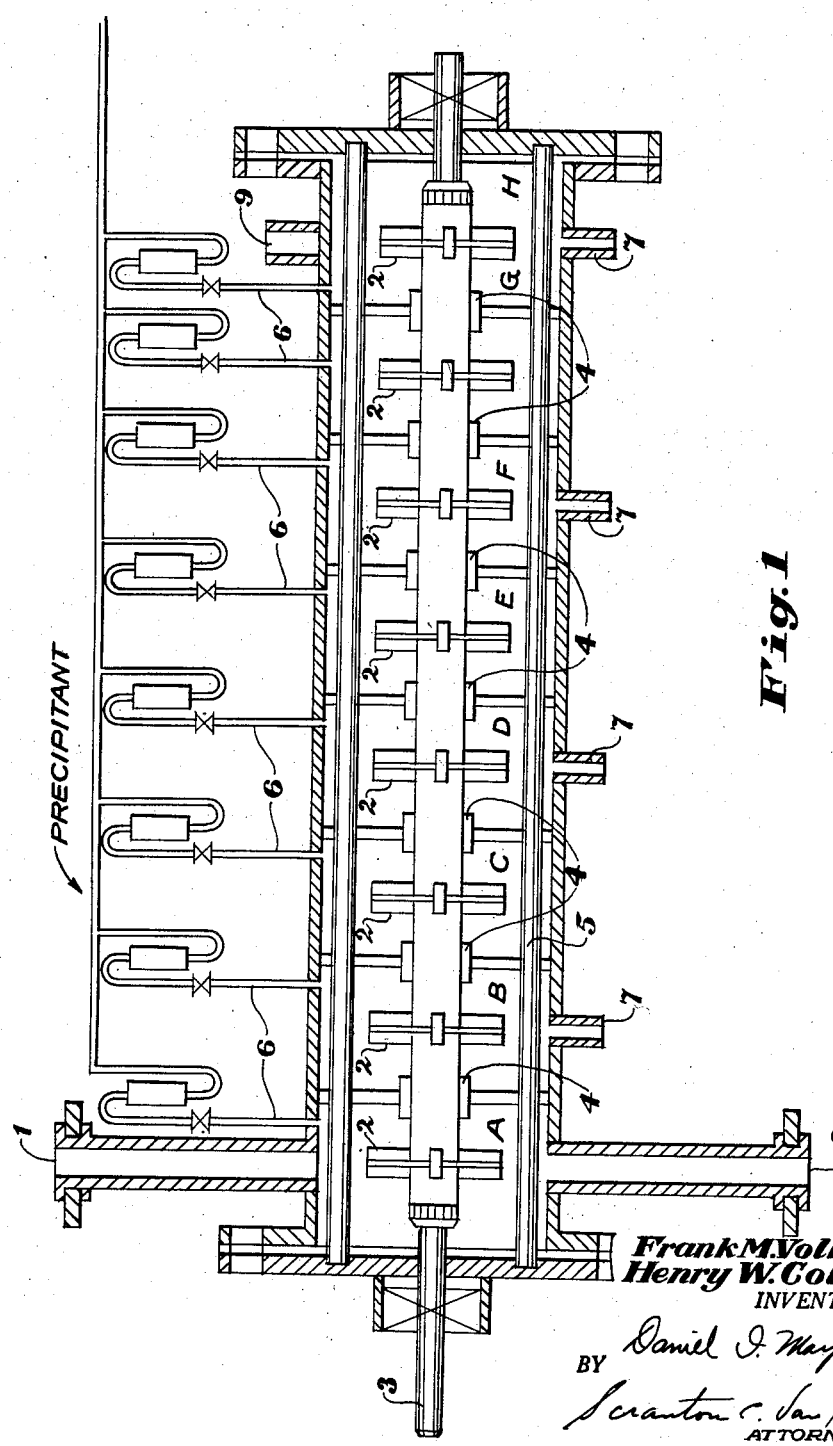

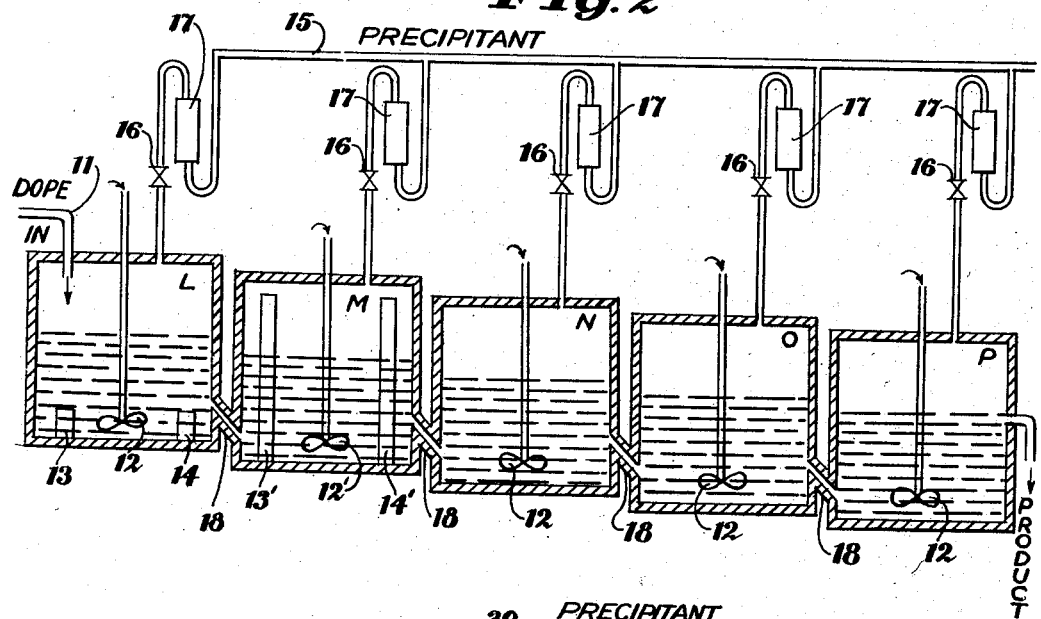
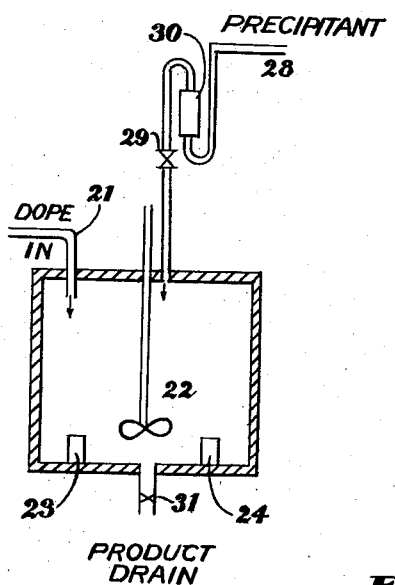

2,891,946
Patented June 23, 1959

2,891,946

POWDER PRECIPITATION OF CELLULOSE ACETATE

Frank M. Volberg and Henry W. Collins, Kingsport, Tenn., assignors to Eastman Kodak Company, Rochester, N.Y., a corporation of New Jersey Application May 31, 1955, Serial No. 512,220

8 Claims. (Cl. 260—230)

This invention relates to a method of powder precipitating cellulose acetates having no more than 5% higher acyl, if any, from the dopes in which they have been prepared by carrying out the precipitation in the presence of a gumminess inducing additive.

In the manufacture of cellulose acetates it is usual to precipitate the ester in the form of flake. This form of product is obtained by adding an acetic acid solution of the ester as results from the cellulose esterification process to an agitated bath of water or weak acetic acid whereby the ester precipitates as coarse, irregular, spongy particles about ¼" to 1" across. The obtaining of a comminuted or powdered precipitate by the procedures previously described involves many difficulties and the products thus obtained ordinarily have characteristics which are undesirable. For instance, cellulose acetate powders made by known procedures settle slowly from aqueous suspension, cloudy, supernatant liquid remaining and the product does not drain well or wash well. The cellulose acetate mass thus obtained when dry is characterized by a large percentage of dusty fines. Some types of cellulose acetate will not give a powder precipitate by the known procedures.

One object of our invention is to prepare cellulose acetates in powder form which are characterized by ease of washing acids therefrom, ease of centrifuging to a high solids percentage and of drying without breaking up into fines. Another object of our invention is to provide a method for powder precipitating cellulose acetates which may be carried out at substantially normal temperatures. A further object of our invention is to provide a method of preparing cellulose acetate precipitates in powder form which involves the addition initially of a small proportion of a suitable additive to an esterification dope in the precipitation process. A still further object of our invention is to provide a process which is adaptable to a continuous cellulose acetate precipitation operation. Other objects of our invention will appear herein.

Our invention relates to a method for the separation of cellulose acetates from the solutions in which they are prepared which involves supplying to a cellulose acetate dope such as results from its preparation, a suitable gumminess inducing additive and precipitating the ester by increasing the water content of the mass so that separation of the cellulose acetate therefrom occurs. The cellulose acetate precipitated may be the simple ester or it may be a cellulose acetate having higher acyl present in the ester such as up to 5% of propionyl or butyryl. In its broadest aspects our invention comprises a precipitation method in which there is added to spent cellulose acetylation dope a small amount of a liquid which will cause gumming of the cellulose acetate during at least part of its precipitation. The liquid employed should have an appreciable or substantial swelling action or even dissolving action on the cellulose acetate and be substantially less hydrophilic than acetic acid. After the gumminess causing liquid has been added to the cellulose acetate solution or dope the cellulose acetate is precipitated by supplying water or very dilute aqueous acid to the mass accompanied by rapid agitation until substantially complete precipitation of the cellulose acetate has occurred. The precipitation procedure takes place at normal temperatures that is temperatures below 150° F., particularly 70–120° F. It is often desirable to run the resulting mass to a large vessel in which it is gently agitated for additional hardening of the cellulose acetate particles.

The gumminess causing liquid added to the spent cellulose acetylation mass is characterized by at least a substantial swelling action on the cellulose acetate and is substantially more hydrophobic than acetic acid. This latter property is shown by the partition condition of the liquid as between butyl acetate and water; for instance, by adding 15 cc. of the liquid to a mixture of 50 cc. water and 50 cc. butyl acetate in a graduated container and determining the increase of the water layer. When acetic acid or acetone is the liquid, the water layer is 57 to 58 cc. When the liquid is of the type useful for our invention, the water layer is about 50–55 cc., it being preferred that there be no substantial increase in the volume of water upon the addition of the liquid considered.

Some liquids useful as gumminess causing additives in accordance with our invention are esters such as the alkyl acetates such as ethyl acetate, isopropyl acetate, normal propyl acetate, butyl acetate, isobutyl acetate and amyl acetate, diethyl phthalate and the like; alkylene chlorides such as methylene chloride, and ethylene chloride; lower fatty acids such as propionic acid, butyric acid and caproic acid; ketones such as methyl propyl ketone, methyl ethyl ketone, and the like; aromatic hydrocarbons such as benzene and toluene or mixtures of various liquids having the prescribed characteristics such as benzene-ethyl acetate. Some liquids such as petroleum distillates although sufficiently hydrophobic have no swelling action on cellulose acetate and, therefore, are not useful in our process of powder precipitating cellulose acetate. It is desirable that the additive should either be easily washed out of the cellulose acetate precipitate or be sufficiently volatile that it can be removed by boiling a slurry of the cellulose acetate.

Some of the additives are of special value for precipitating certain cellulose acetates. For instance, methylene chloride is particularly effective as an additive in the powder precipitation of cellulose acetates of an acetyl value of at least 42%. The alkyl acetates such as isopropyl acetate are most useful for processes of precipitating cellulose acetates having an acetyl of 38 up to 42% acetyl. Propionic butyric acids are especially useful for the powder precipitation of cellulose acetates which have been hydrolyzed down to an acetyl content of about 36–39%. The ketones such as methyl propyl ketone and the organic acid esters such as diethyl phthalate are useful as gumminess causing additives in the precipitation of cellulose acetates having a 38–41% acetyl content by our invention.

In the carrying out of precipitations in accordance with our invention the ester comes out of solution at or near the "break point" where a decided drop of viscosity of the cellulose ester mass appears. The cellulose acetate appears to be highly plastic or in a semi-fluid condition. Apparently these particles gain a certain degree of plasticity. Through further dilution with water, the product obtained consists of particles having a good outer surface. In the case of hydrolyzed cellulose acetates the amount of additive used is ordinarily 5–30%, by weight, based on the total mass to which it is added whereas with the cellulose acetates which have been hydrolyzed but little, if any, such as those having an acetyl content of at least 42% the amount of additive is desirably within the range of 15–40% based on the weight of the total dope to which the additive is supplied.

In the carrying out of the precipitation the additive is supplied to the dope in the desired amount, which dope is also increased in water content such as by slowly adding water or dilute aqueous acetic acid thereto under vigorously agitated conditions whereby the composition of the mass is brought near to but short of its "break point." This addition may, for instance, be accomplished if desired before introducing the mass to a continuous apparatus or in one of a series of chambers or it may be merged in the precipitation method proper so as not to be identified as an individual step. The "break point" of the cellulose acetate may be described as that point in the progressive dilution of the acid dope with precipitant (water or aqueous acid) where the first significant portion of cellulose acetate comes out of solution. At this point a small increase of precipitant will result in a major decrease in the viscosity of the system and cause a considerable portion of the cellulose acetate to come out of solution. At no other step during the progressive aqueous dilution of the dope is there such a marked decrease in the viscosity of the system. If the precipitation is to be carried out continuously the dope may be moved through a series of compartments in each of which the water concentration of the dope is continuously increased. The precipitation method may be carried out as a batch procedure, rather than continuous, if desired.

In the apparatus to be employed for continuous precipitation in accordance with our invention, any type of agitator which vigorously agitates the liquid during the process may be employed. The blades may be of the turbo type, the propeller type or some other type of agitating means. Baffles may be present in the chambers to aid in the mixing of the liquid in the precipitation process. The apparatus may be a horizontal series of mixing chambers such as shown in Fig. 1 of the accompanying drawings: a mixing apparatus such as shown in Fig. 2 employing a series of connected chambers, a continuous turbo type mixer similar to that shown in Perry's Chemical Engineers Handbook, 3rd edition, 1950, page 1211, or a single container as illustrated by Fig. 3 of the drawings.

In the accompanying drawings Figs. 1 and 2 illustrate continuous types of apparatus useful in a precipitation operation in accordance with our invention. Fig. 3 illustrates an apparatus in which a batchwise precipitation process in accordance with our invention may be carried on if a precipitation of that nature is desired.

Referring to Fig. 1, a dope of a cellulose ester, the acyl of which is substantially all acetyl and to which the selected quantity of a gumminess causing additive has been supplied, enters the apparatus through conduit 1 and is agitated in compartment A by stirrer 2 on a shaft 3 driven at a speed of 200–600 r.p.m., the driving mechanism not being shown. If desired, the apparatus can be so constructed that supplying the additive to the mass while in the first chamber A is possible. The apparatus may conveniently consist of a cylindrical vessel 10 feet long and 2 feet diameter having dividing plates therein, with some clearance between the plates and the shaft running lengthwise of the vessel to motivate the agitators in each individual compartment.

The dope from compartment A continuously passes through the apparatus into successively agitated compartments B, C, D, E, F and G through successive annular spaces 4. Agitator blades are provided in each compartment. Baffles in the form of rods 5 are provided to improve the agitation. Inlets 6 are provided in each compartment for the introduction of aqueous acid or water thereto. These inlets are supplied from a suitable diluent header and may be provided with a valve and rotometer or some other type of control device as may be convenient to allow individual control of the dilution to each compartment separately. Sampling cocks such as 7 and a drain 8 may also be provided. The slurry of cellulose acetate precipitate obtained may be removed from the apparatus through conduit 9. In some cases the cellulose acetate slurry is centrifuged, the solids obtained are reslurried in 10% aqueous acid, then separated from the liquid, washed and dried.

The apparatus illustrated in Fig. 1 is adapted to run full and the liquid is continuously moved along by the pressure from the dope and acid or water which is introduced in the operation of the precipitation method. The apparatus may contain a greater or lesser number of compartments than illustrated.

Fig. 2 illustrates another type of apparatus suitable for the practice of our invention. This apparatus consists of a series of separate interconnected agitated vessels in which the starting dope enters the first vessel L through the conduit 11. This dope may have already been supplied with the additive as described above or an inlet means may be present through which the additive may be passed into vessel L as the dope is introduced therein. In vessel L the dope is agitated by stirrer blades 12 in conjunction with baffles 13 and 14, the blades being suitably energized by means not shown. Water or dilute aqueous acid is added to vessel L through conduit 15, the flow rate of this acid being controlled by valve 16 and rotometer 17. The uniformly mixed contents of vessel L are continuously passed through conduit 18 to vessel M as further dope is led into vessel L through conduit 11. In the apparatus illustrated, the flow is induced by gravity by providing a suitable vertical spacing of the vessels. If desired, a pump may be provided. Each of the succeeding vessels M, N, O and P have provision both for agitation and for the introduction of water such as in the form of aqueous acid and are provided with conduits so that the mass continuously passes from one vessel to the next.

The product in vessel P is a slurry of the cellulose acetate in divided form in a mixture of the acid and water. The slurry may be led from this vessel into draining, washing and drying operations as is known to those skilled in the cellulose ester art or the cellulose ester may be separated therefrom and reslurried as mentioned above.

Fig. 3 shows a single vessel for the batchwise precipitation of cellulose esters in which the dope to which additive may have been supplied is led to the vessel through conduit 21. If desired, the vessel may be fitted with an additional inlet and the additive may be mixed with the dope by leading it through this inlet into the vessel. The dope is agitated by stirrer 22 against baffles 23 and 24, the stirrer being energized by means not shown. The conduit 28 provided with valve 29 and rotometer 30 is provided for the addition of dilute aqueous acid or water to lower the acid content of the dope to a point where precipitation occurs. The initial charge to the vessel should be sufficiently small that the vessel can contain the entire quantity of precipitating acid which needs to be added. The slurry obtained may be drained off through valve 31 and further processed.

Powdered cellulose acetate is prepared in accordance with our invention by a procedure which involves acetylating cellulose, adding additive as described to the completed esterification mass whether hydrolyzed or not and introducing water such as in the form of dilute aqueous acetic acid to the mass while vigorously agitating. The cellulose acetate may be prepared by reacting upon cellulose with acetic anhydride and acetic acid diluent in the presence of catalyst. The cellulose acetate thus obtained may be precipitated with or without substantial hydrolysis prior to the precipitation procedure. In such a process the additive is added to the esterification mass prior to or at the time the precipitating liquid is added unless, of course, one of the additives referred to has been used as a part of the solvent in the esterification procedure. The cellulose acetate may be prepared in a bath using acetic anhydride and some other solvent such as methylene chloride, ethyl acetate or the like. In that case instead of adding gumminess causing additive thereto, some of that material is removed such as by a distillation procedure prior to the addition of the precipitant (water) to the esterification mass. If too much additive is present, a large size precipitate rather than a powder is obtained. On the other hand, if too little of the gumminess causing additive is present a powder is obtained having a considerable content of fine particles therein.

The following examples illustrate our invention:

Example 1

7.25 lbs. of refined cotton linters (0.25 lb. of water) were mixed with 28 lbs. of glacial acetic acid in a Werner-Pfleiderer type acetylation mixer which was run for 30 minutes at 110° F. 15.1 lbs. of glacial acetic acid were added and the mass was cooled to 90° F. There was then added a mixture of 17.2 cc. of 93.7% sulfuric acid in 300 grams of glacial acetic acid, the temperature was reduced to 66° F., 19.6 lbs. of 97% acetic anhydride cooled to 35° F. was added and the temperature was maintained at 66–72° F. for 15 minutes and then lowered to 50° F. 111.5 cc. of sulfuric acid in 360 grams of glacial acetic acid were then added and the temperature of the mass was allowed to rise to 88° F. over a period of 1½ hours. The cellulose completely dissolved in the reaction mass.

The jacket temperature of the mixer was raised to 140° F. and 26½ lbs. of 65% aqueous acetic acid was added to the mass over a period of 15 minutes during which time the mass temperature rose to 140° F. It was then transferred to a turbo agitated vessel and held at 140° F. until the acetyl content of the cellulose acetate had reached 40%. There was then added a solution of 222 grams of magnesium carbonate in 50 lbs. of 40% aqueous acetic acid having a temperature of 110° F.

3630 grams of the resulting mass were placed in a small baffled turbo vessel and agitated with a turbo agitator. 290 grams of butyl acetate were stirred into the dope. While the mass was vigorously agitated, water was slowly added thereto. When the acid concentration reached 38–43% initial precipitation of the ester occurred. The addition of water was continued until complete precipitation was obtained. The pricipitation was carried out at room temperature. The precipitate obtained was separated from the liquid, washed with water and dried. A hard, uniform powder was obtained having a bulk density of 15.7 lbs. per cubic foot.

Example 2

Cellulose was acetylated as described in the preceding example. 3805 grams of the solution of hydrolyzed cellulose acetate obtained were placed in a small baffled turbo vessel, agitated with a turbo type agitator and 435 grams of benzene was thoroughly mixed therein. The mass was vigorously agitated and water was slowly added until the acid concentration reached 38%–43% whereupon initial precipitation occurred, the temperature being at 90–95° F. The addition of water was continued until complete precipitation had occurred whereupon the product was separated from the liquid mass, washed and dried. A hard, uniform powder having a bulk density of 9.7 lbs. per cubic foot was obtained.

Example 3

Cellulose acetate was prepared as described in Example 1 and 100 parts of the cellulose acetate solution thus obtained were mixed with 12 parts of ethyl acetate. The resulting dope having a temperature of 100° F. was introduced into a vertical, cylindrical vessel having 8 compartments each equipped with a turbo agitator. Approximately 250 parts of 5% aqueous acetic acid at room temperature was fed into this vessel at 8 points along its length in such manner that the acid in the first compartment was approximately 45% aqueous and that in the subsequent compartments was reduced in approximately equal steps to a concentration of about 25% in the 8th compartment. The resulting slurry in the 8th compartment was withdrawn and was centrifuged, washed and dried resulting in a uniform, sandy powder which bulks well and is relatively free of fines.

Example 4

720 lbs. of cotton linters (approximately 3% moisture) were mixed with 700 lbs. of glacial acetic acid containing 3.9 lbs. of 93.7% sulfuric acid in a Werner-Pfleiderer type mixer. The mixer was run for 30 minutes at 110° F. 2380 lbs. of methylene chloride were added, the mass was cooled to 90° F. and a solution of 9 lbs. of 93.7% sulfuric acid in 10 lbs. of glacial acetic acid were added. The temperature was reduced to 66° F. 1820 lbs. of 97% acetic anhydride having a temperature of 35° F. were added and the temperature was allowed to rise to 100° F. over 1½ hours. The cellulose completely dissolved.

The jacket temperature of the mixer was raised to 80° F. and 2000 lbs. of 65% acid at 90° F. were added over a period of 30 minutes. The temperature of the mass rose to 105° F. It was then placed in a jacketed turbo-agitated vessel where the cellulose acetate was allowed to hydrolyze as the temperature was raised to 125° F. and the methylene chloride was boiled off and the vapors were condensed and recovered for future use. During this hydrolysis, 4000 lbs. of 65% acid was slowly added to the mass. When the cellulose acetate reached an acetyl content of 39% there was added a solution of 13 lbs of magnesium carbonate in 3400 lbs. of 60% aqueous acetic acid at 125° F.

1470 lbs. of isopropyl acetate were then added and the mass having a temperature of 125° F. was introduced into the first compartment of a vertical cylindrical vessel having 8 compartments each equipped with a turbo agitator. Approximately 250 parts of 5% aqueous acid at room temperature were introduced into the vessel at 8 points along its length in such manner that the acid in the first compartment was of approximately 45% strength and the acid in subsequent compartments was reduced in approximately equal steps to a concentration of about 25% in the 8th compartment. The slurry obtained in the 8th compartment was led off therefrom and the product was centrifuged, washed and dried to give a uniform, sandy powder free of fines and having a bulk value of 17–20 lbs. per cubic foot.

Example 5

7.25 lbs. of refined cotton linters (3.8% moisture) were mixed with 28 lbs. of glacial acetic acid in a Werner-Pfleiderer type acetylation mixer. The mixer was run for 30 minutes at 100° F. 15.1 lbs. of glacial acetic acid were added, the mass was cooled to 90° F. and a solution of 17.2 cc. of 93.7% sulfuric acid in 300 grams of glacial acid were added. The temperature was then reduced to 66° F. 19.6 lbs. of 97% acetic anhydride, temperature 35° F., were added to the mixer. The temperature was maintained at 66–72° F. for 15 minutes and then cooled to 50° F. A solution of 111.5 cc. of sulfuric acid in 360 grams of glacial acetic acid was added and the temperature of the mass was allowed to rise to 88° F. over a period of 1½ hours. The cellulose completely dissolved. The jacket temperature of the mixer was raised to 180° F. and a mixture of 690 grams of distilled water, 12.5 lbs. of acetic acid and 222 grams of magnesium carbonate was heated to 180–190° F. and added to the mixer over a period of 30 minutes during which time the temperature of the mass rose from 80° F. to 150° F.

67 lbs. of the resulting solution of 43.8% acetyl cellulose acetate in acetic acid were added to a small baffled, jacketed turbo vessel and cooled to 100° F. 20 lbs. of methylene chloride were stirred into the solution. The solution was then vigorously agitated whereupon 15% strength acetic acid, temperature 110° F., was added over a period of 20 minutes until the acid concentration dropped to 35%. The cellulose acetate precipitate obtained was centrifuged, washed and dried. There was obtained a hard, uniform sandy powder relatively free of fines and having a bulk density of 23.1 lbs. per cubic foot.

*Example 6*

A cellulose acetate solution in acetic acid was prepared as described in Example 1. 3630 grams of this solution were placed in a small baffled turbo vessel and agitated with a turbo agitator, 740 grams of butyric acid being added to the mass. While the mass was vigorously agitated water was slowly added until the acid concentration was approximately 38–43%. Initial precipitation of the ester occurred at a temperature of 90–95° F. The addition of water was continued until complete precipitation had occurred. The cellulose acetate precipitate was separated from the liquid, washed and dried. A hard, uniform powder was obtained.

*Example 7*

A solution of cellulose acetate was prepared in the manner described in Example 1. 3630 grams of the solution were placed in a turbo type vessel and 404 grams of caproic acid were incorporated therein. The mass was vigorously agitated while water was added until the acid concentration had been reduced to 38–43%. Initial precipitation of the ester occurred, the temperature being 90–95° F. The addition of water was continued until complete precipitation was obtained. The resulting cellulose acetate precipitate was separated from the liquid, washed and dried. A hard, uniform, powder was obtained having a bulk density of 15.9 lbs. per cubic foot.

*Example 8*

A solution of cellulose acetate was prepared as described in Example 1. 3630 grams of that solution were placed in a turbo type vessel, 545 grams of methyl propyl ketone were stirred therein and while vigorously agitating, water was slowly added to the mass. When the acid concentration was reduced to 38–43% initial precipitation of the ester occurred, the temperature being 90–95° F. The addition of water was continued until complete precipitation had occurred. The cellulose acetate precipitate obtained was separated from the liquid, washed and dried. The product was a hard, uniform powder having a bulk density of 11.1 lbs. per cubic foot.

We claim:

1. A method of powder precipitating acetyl cellulose from its solution in acetic acid, resulting from its preparation in an esterification bath containing acetic acid as the solvent which comprises adjusting to within the range of 5–40% by weight the content therein of an organic liquid selected from the group consisting of the alkyl acetates, the alkyl being of 2–4 carbon atoms, diethyl phthalate, methylene chloride, ethylene chloride, propionic acid, butyric acid, caproic acid, methyl propyl ketone, methyl ethyl ketone, benzene, toluene, and their mixtures and adding to the acetyl cellulose solution thus obtained at a normal temperature below 150° F. at which the liquids all remain in that form, and accompanied by vigorous agitation, an aqueous liquid in sufficient amount to substantially completely precipitate the acetyl cellulose from the solution in the form of small particles.

2. A method of preparing a powder precipitated cellulose acetate from its solution in acetic acid resulting from its preparation in an esterification bath employing acetic acid solvent which comprises adjusting the amount of isopropyl acetate therein to within the range of 5–40% by weight and then adding to the so obtained cellulose acetate solution at a normal temperature below 150° F. at which the liquids therein remain in that form, and with vigorous agitation, an aqueous liquid in sufficient amount to substantially completely precipitate the cellulose acetate from the solution in the form of small particles.

3. A method of preparing a powder precipitated cellulose acetate in a continuous manner from its solution in acetic acid which results from the preparation of the cellulose acetate in a bath employing acetic acid solvent which comprises adjusting to within the range of 5–40% by weight the amount in the solution of an organic solvent selected from the group consisting of the alkyl acetates, the alkyl being of 2–4 carbon atoms, diethyl phthalate, methylene chloride, ethylene chloride, propionic acid, butyric acid, caproic acid, methyl propyl ketone, methyl ethyl ketone, benzene, toluene and their mixtures, and continuously introducing the thus obtained solution into a series of chambers in each of which the entire volume is agitated, progressively increasing the aqueous dilution of the solution as it passes from chamber to chamber until a dilution is reached where complete precipitation has occurred, removing the thus formed slurry from the last chamber of the series, separating therefrom the precipitated cellulose acetate and drying the powder thus obtained.

4. A method of preparing a powder precipitated cellulose acetate from its solution in acetic acid, resulting from its preparation in an esterification bath employing acetic acid solvent, which comprises adjusting the amount of methylene chloride therein to within the range of 5–40% by weight and then adding to the so obtained cellulose acetate solution at a normal temperature below 150° F., at which the liquids therein remain in that form, and with vigorous agitation, an aqueous liquid in sufficient amount to substantially completely precipitate the cellulose acetate from the solution in the form of small particles.

5. A method of preparing a powder precipitated cellulose acetate from its solution in acetic acid, resulting from its preparation in an esterification bath employing acetic acid solvent, which comprises adjusting the amount of ethyl acetate therein to within the range of 5–40% by weight and then adding to the so obtained cellulose acetate solution at a normal temperature below 150° F., at which the liquids therein remain in that form, and with vigorous agitation, an aqueous liquid in sufficient amount to substantially completely precipitate the cellulose acetate from the solution in the form of small particles.

6. A method of preparing a powder precipitated cellulose acetate from its solution in acetic acid, resulting from its preparation in an esterification bath employing acetic acid solvent, which comprises adjusting the amount of butyl acetate therein to within the range of 5–40% by weight and then adding to the so obtained cellulose acetate solution at a normal temperature below 150° F., at which the liquids therein remain in that form, and with vigorous agitation, an aqueous liquid in sufficient amount to substantially completely precipitate the cellulose acetate from the solution in the form of small particles.

7. A method of preparing a powder precipitated cellulose acetate from its solution in acetic acid, resulting from its preparation in an esterification bath employing acetic acid solvent, which comprises adjusting the amount of benzene therein to within the range of 5–40% by weight and then adding to the so obtained cellulose acetate solution at a normal temperature below 150° F., at which the liquids therein remain in that form, and with vigorous agitation, an aqueous liquid in sufficient amount to substantially completely precipitate the cellulose acetate from the solution in the form of small particles.

8. A method of preparing a powder precipitated cellulose acetate in a continuous manner from its solution in acetic acid, which results from the preparation of the cellulose acetate in a bath employing acetic acid solvent, which comprises adjusting the amount of isopropyl acetate therein to within the range of 5–40% by weight and continuously introducing the thus obtained solution into a series of chambers in each of which the entire volume is agitated, progressively increasing the aqueous dilution of the solution as it passes from chamber to chamber until a dilution is reached where complete precipitation occurs, removing the thus formed slurry from the last chamber of the series, separating therefrom the precipitated cellulose acetate and drying the powder thus obtained.

References Cited in the file of this patent

UNITED STATES PATENTS

| | | |
|---|---|---|
| 2,239,782 | Haney | Apr. 29, 1941 |
| 2,301,904 | Lamborn | Nov. 10, 1942 |
| 2,607,771 | Groombridge et al. | Aug. 19, 1952 |
| 2,740,776 | Rosen et al. | Apr. 3, 1956 |
| 2,816,888 | Lamborn | Dec. 17, 1957 |

FOREIGN PATENTS

| | | |
|---|---|---|
| 539,155 | Great Britain | Aug. 29, 1941 |